United States Patent [19]

Kakino et al.

[11] Patent Number: 4,961,034

[45] Date of Patent: Oct. 2, 1990

[54] NUMERICAL CONTROL DEVICE

[75] Inventors: Yoshiaki Kakino, No. 256-5, Hanazono-cho, Iwakura, Sakyo-ku, Kyoto-shi, Kyoto; Yukitoshi Ihara, No. 583, Gojyobashihigashi 6-chome, Higashiyama-ku, Kyoto-shi, Kyoto; Mitsuo Yonetani; Takeo Teshima, both of Aichi, all of Japan

[73] Assignees: Yoshiaki Kakino; Yukitoshi Ihara, both of Kyoto; Mitsubishi Denki Kabushiki Kaisha, Tokyo, all of Japan

[21] Appl. No.: 317,390

[22] Filed: Mar. 1, 1989

[30] Foreign Application Priority Data

Mar. 1, 1988 [JP] Japan ................... 63-48118

[51] Int. Cl.⁵ .......................................... G05B 19/00
[52] U.S. Cl. .................... 318/600; 318/603; 318/561; 318/571; 318/630
[58] Field of Search ............. 318/560–575, 318/343.4

[56] References Cited

U.S. PATENT DOCUMENTS

| | | | |
|---|---|---|---|
| 3,866,212 | 2/1975 | Simon et al. | 318/625 X |
| 3,886,424 | 5/1975 | Hoshima et al. | 318/604 X |
| 4,081,732 | 3/1978 | Aoyama | 318/603 |
| 4,341,986 | 7/1982 | Browder | 318/604 X |
| 4,478,009 | 10/1984 | Rukavina et al. | 318/571 X |
| 4,502,108 | 2/1985 | Nozawa et al. | 318/630 X |
| 4,506,321 | 3/1985 | Comstock et al. | 318/561 X |
| 4,513,646 | 4/1985 | McMurty | 318/571 X |
| 4,523,134 | 6/1985 | Kinoshita et al. | 318/599 X |
| 4,525,658 | 6/1985 | Yanigida | 318/599 X |
| 4,574,227 | 3/1986 | Herder et al. | 318/594 |
| 4,587,469 | 5/1986 | Ikebe et al. | 318/632 X |
| 4,698,569 | 10/1987 | Kimura et al. | 318/567 |
| 4,707,780 | 11/1987 | Gose et al. | 364/513 X |
| 4,713,596 | 12/1987 | Bose | 318/561 X |
| 4,748,555 | 5/1988 | Miyake et al. | 318/632 X |
| 4,795,955 | 1/1989 | Yamashita | 318/563 X |
| 4,912,385 | 3/1990 | Kawamura et al. | 318/603 |

Primary Examiner—William M. Shoop, Jr.
Assistant Examiner—Paul Ip
Attorney, Agent, or Firm—Sughrue, Mion, Zinn, Macpeak & Seas

[57] ABSTRACT

A numerical control device comprising a lost motion correction data calculating device having a table/function which represents the motor current of a servo motor, in a servo mechanism for servo-controlling a mechanical movable part. The motor current is detected at a given time instant, and the corresponding amount of lost motion correction is then calculated. The position error caused by the lost motion can be corrected with high accuracy.

3 Claims, 9 Drawing Sheets

NUMERICAL CONTROL DEVICE

BACKGROUND OF THE INVENTION

This invention relates to numerical control devices (hereinafter referred to as "NC devices", when applicable), and more particularly to an improvement of the accuracy in motion position of a movable part of a machine controlled by an NC device, such as a numerically controlled (NC) machine tool, which operates on a lost motion correction system in a semi-closed loop system which is one example of a servo loop system for a numerically controlled (NC) machine tool.

In a general semi-closed loop system for an NC machine tool, the torque of the servo motor is converted into a linear motion by a ball thread feed drive mechanism to linearly move a movable part of the NC machine tool, and in this operation, the position control of the movable part is carried out as follows: The position detection of the movable part is not made at its end; that is, the angle of rotation of the movable part is detected with a detector coupled to the end of the ball thread or the drive motor thereby to indirectly detect the position of the movable part. The feed drive mechanism is "twisted" or "bent" depending on a load applied thereto. Therefore, the stop position of the movable part when positioned in place in a forward (positive) direction will differ from that of the movable part when positioned in a reverse (negative) direction. In order to correct the difference between the two stop positions, a method has been employed in which the value with the feed speed set to about 100 mm/min, the difference is measured, and it is applied, as a backlash correcting value including a lost motion correcting value, to the NC device, to correct the amount of mechanical movement.

The lost motion, which is one of the factors causing the difference between the two stop positions, attributes to a mechanism different from the play (backlash) of the ball thread in the drive system. This will be described with reference to a linearly movable part such as a table, saddle or slide in a machine tool (hereinafter referred to as "a table", when applicable, for simplification in description) in brief.

FIG. 9 shows the arrangement of a general ball thread feed drive mechanism. The ball thread feed drive mechanism comprises a number of mechanical components such as a ball thread, bearings, brackets, and parts for mounting and securing these components. In the feed drive mechanism, various parts are displaced by a torque of the drive motor, and by the load of the system. The torque of the drive motor is transmitted through a coupling to the ball thread shaft to which tension has been given in advance to improve its rigidity, and to the nut section combined with the ball thread shaft, thus linearly driving the table which is fixedly secured to the nut section and is supported by linear bearings. On the other hand, in order to improve the rigidity and accuracy of the mechanical system, the bearing section supporting the ball thread shaft and the linear bearing section supporting the table are suitably pre-loaded, thus providing their best mechanical characteristics.

From these results, at the start of the movement of the table, the load torque to the servo motor is as indicated by the following equation (1):

$$M_{T0} \propto \mu_0 \cdot W \cdot k_1 + t_{N0} + t_{M0} + t_{B0} + k_2 \cdot W_I f_1^2 + k_3 \cdot R_I f_2^2 + C \quad (1)$$

where $M_{T0}$: the torque to the servo motor at the start of the movement (load on the table=0)

$\mu_0$: the coefficient of friction of the table and the linear bearing section at the start of the movement W: the weight of the table $k_1$: the constant for converting linear motion force into torque $k_2, k_3$: the constants for converting inertial moment into torque $t_{N0}$: the frictional torque of the ball thread shaft and the nut $t_{M0}$: the servo motor frictional torque $t_{B0}$: the frictional torque of the bearing section supporting the ball thread shaft $W_I$: the inertial moment of the table $R_I$: the inertial moment of the rotary section $f_1$: the table speed $f_2$: the speed of the rotary section C: the constant The friction affecting the torque is greatly changed by the pre-load, the viscosity and quantity of lubricant used, and the feed speed.

When a product weight w is applied onto the table, the load torque $M_{Tw}$ to the servo motor is as indicated by the following equation (2):

$$M_{Tw} \propto \mu_0 \cdot (W+w) \cdot k_1 + t_{N0} + t_{M0} + t_{B0} + k_2 \cdot (W_I + w_i) \cdot f_1^2 + k_3 \cdot R_I f_2^2 + C \quad (2)$$

where $M_{Tw}$: the torque to the servo motor at the start of the movement (load on the table=W)

$w_I$: the inertial moment of the product

The displacement in motion position of the table attributing to the torque depends on the displacement (elastic deformation) of the various parts, the ball thread, the ball thread shaft, the bracket section, and the stationary structure of the motor drive system. The twisting and bending of the ball thread shaft, being the function of the length between the drive section and the nut section, can be expressed as follows:

$$\Delta SM_{Tw} \propto k_L \cdot \Delta S_N \cdot M_{Tw} + \Delta S_M \cdot M_{Tw} + \Delta S_B \cdot M_{Tw} + \Delta S \cdot S_{MTw} + \Delta S \cdot C \quad (3)$$

where $\Delta SM_{Tw}$: the amount of displacement upon application of torque $M_{Tw}$ $\Delta S_N \cdot M_{Tw}$: the amount of displacement of the thread section upon application of torque $M_{Tw}$ $S_M \cdot M_{Tw}$: the amount of displacement of the motor section upon application of torque $M_{Tw}$ $\Delta S_B \cdot M_{Tw}$: the amount of displacement of the ball thread bearing and bracket section upon application of torque $M_{Tw}$ $\Delta S \cdot SM_{Tw}$: the amount of displacement of the drive system stationary structure section upon application of torque $M_{Tw}$ $K_L$: the coefficient of displacement of the ball thread depending on the distance from the drive section $\Delta S \cdot C$: the constant This displacement changes with the torque; that is, it changes when the speed of the table is increased from substantially zero (at rest) at around the speed of feed used for actual work, thus being proportional to the variations in the position of the table, the inertial moments of the moving parts, and the coefficients of frictions of the bearing sections and the table. The displacement mentioned above may be disregarded when the structure is made sufficiently rigid against the load. However, in the case where it is impossible to increase the rigidity because of the mechanical structure or manufacturing cost, sometimes those of the resultant machine are considerably large. In the case where the above-described table is positioned in the forward direction, and is moved in the opposite (reverse) direction, the torque is inverted in direction, and the table coupled through the ball thread to the servo motor will not be moved even if the servo motor rotates as much as the sum of the displacement in the forward direction and that in the reverse direction (two times the amount of displacement $\Delta SM_{Tw}$). Thus, the amount of correction of baCklash, whiCh haS been initially measured and set with the speed of feed of about 100 mm/min, is not that which is determined by taking into account the speed of the feed, the load on the table, and the length of the ball thread from the drive section. Accordingly, the positioning effected under the conditions different from those preset is not sufficiently high in accuracy. With respect to the lost motion, if the servo motor is held at rest for a long time being firmly clamped, or the whole system is subjected to small oscillation, then the displacement may be released. FIG. 10 is a graphical representation indicating the follow-up characteristics of an NC machine tool. FIGS. 11 and 12 are also graphical representation generally indicating amounts of lost motion with speed of feed.

As is apparent from the above description, a conventional NC machine tool has the lost motion which changes essentially with machining conditions; however, it has no means for detecting only the lost motion. Accordingly, the NC device itself has no function of correcting the lost motion, and the correction has been performed in terms of backlash correction. Thus, whenever the machining conditions change, the machining accuracy is changed. Recently, there has been a strong demand for the provision of a stable and accurate machining technique, and accordingly for the correction of lost motion.

SUMMARY OF THE INVENTION

The present inventors discovered through experiments that the drive current of the servo motor can provide data sufficiently high in accuracy for detection of the above-described torque without provision of a particular sensor.

An object of the present invention is to provide a numerical control device which is capable of correcting position errors caused by lost motion with high accuracy.

Based on the above-described principle, an NC device according to the invention includes a lost motion correction data calculating device having a table/function which represents the motor current of a servo motor in a servo system for servo-controlling a mechanically movable part, which the motor current is detected at a given time instant and the corresponding amount of lost motion correction is then calculated.

The NC device of the invention utilizes the drive current of the servo motor detected at a given time instant, to calculate according to the table/function the amount of lost motion correction, as an amount of deformation of the feed drive mechanism, corresponding to the motor output torque, whereby the position error of the mechanical movable part due to the lost motion is corrected.

BRIEF DESCRIPTION OF THE DRAWINGS

In the accompanying drawings, FIG. 1 is a graphical representation indicating amounts of lost motion with motor output torque in an arc interpolation; FIG. 2 is a graphical representation indicating amounts of lost motion with motor output torque in a linear interpolation; FIG. 3 is a block diagram showing the arrangement of a numerical control device for the correction of lost motion, which is a first embodiment of this invention; FIG. 4 is a graphical representation showing the time instant the motor feedback speed is inverted; and FIG. 5 is a graphical representation showing the time instant the motor starts movement.

DESCRIPTION OF THE PREFERRED EMBODIMENTS

As was described above, the lost motion phenomenon results from the elastic deformation of the feed system and stationary structure of the NC machine tool, and therefore its magnitude is changed by the frictional resistance of the table. Accordingly, the backlash correcting function of applying a predetermined correcting pulse at the time of reversing the direction of motion is insufficient to correct the lost motion. Therefore, in the invention, research is conducted on the relationship between amounts of lost motion and servo motor drive currents (hereinafter referred to merely as "drive currents", when applicable) in advance, and the lost motion correction is carried out according to the relationship thus researched.

Figure 1:
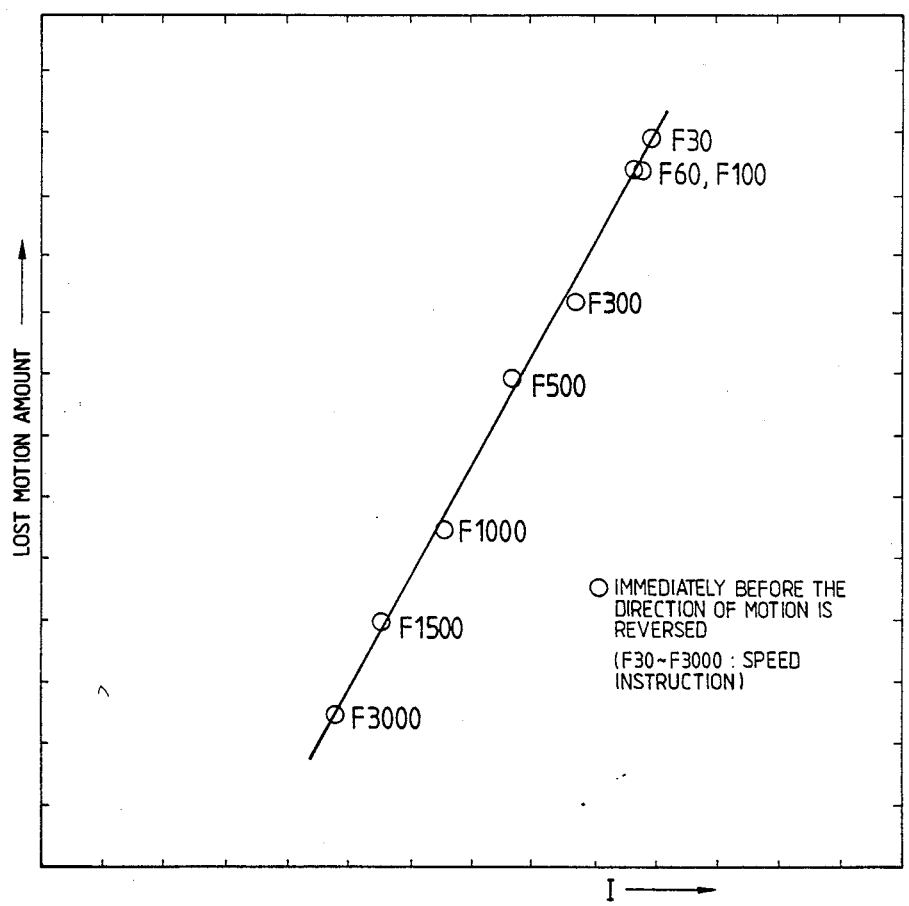
FIGS. 1 through 5 are diagrams for a description of a first embodiment of this invention. More specifically.
Figure 2:
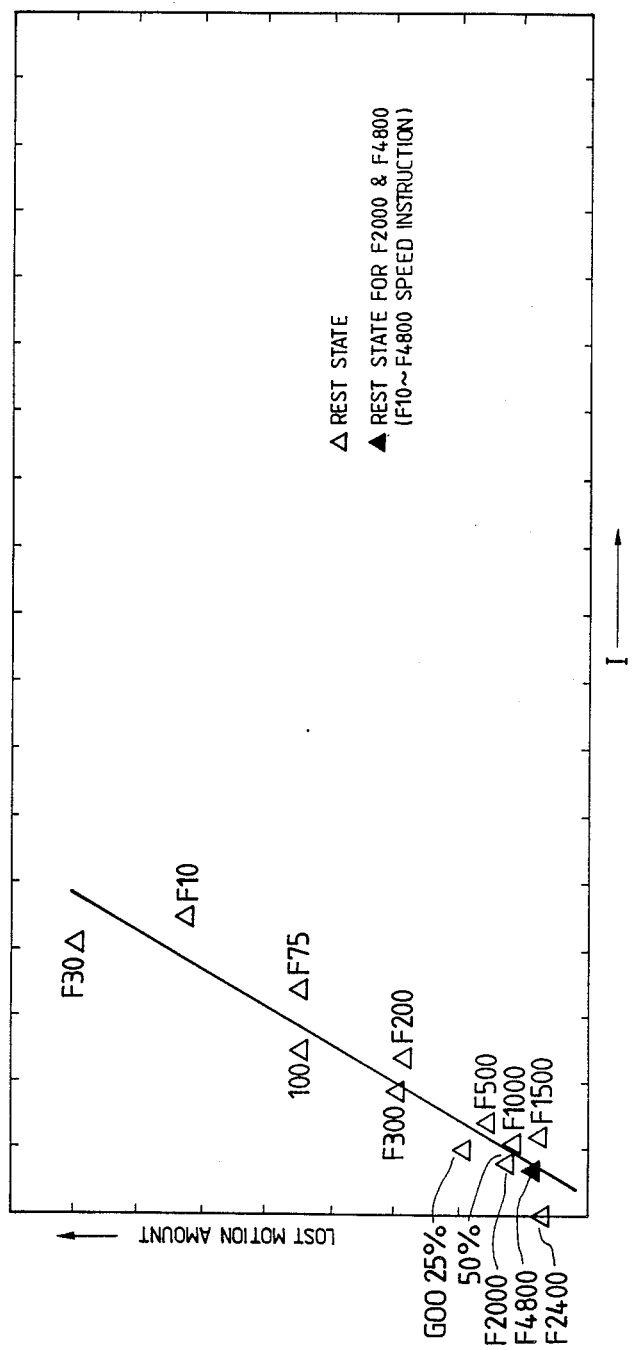

FIG. 1 is a graphical representation indicating amounts of lost motion with drive currents in an arc interpolation. The graphical representation is obtained by measuring from the result of experiments the torque provided immediately before the direction of motion is reversed and the amount of lost motion at that time instant, and by plotting those data for each speed. As is seen from FIG. 1, in an arc interpolation, the drive current relates linearly to the amount of lost motion. FIG. 2 shows relationships between amounts of lost motion and drive currents when, in a quick feed or linear interpolation, the movable part is at rest. In this case also, a linear relation is established between the amount of lost motion and the drive current. It has been found through experiments that this relation is scarcely affected by the change of an acceleration and deceleration pattern or time constant, and therefore the quick feed can be handled in the same manner as the linear interpolation. Therefore, if a table/function representing a drive current with an amount of lost motion corresponding thereto is determined, then by inserting a machining drive current as a variable in the function, the amount of lost motion correction under the machining conditions can be calculated. That is, the lost motion can be corrected by applying a movement signal as much as the amount of lost motion correction thus calculated.

Now, one embodiment of this invention will be described.

Figure 3:
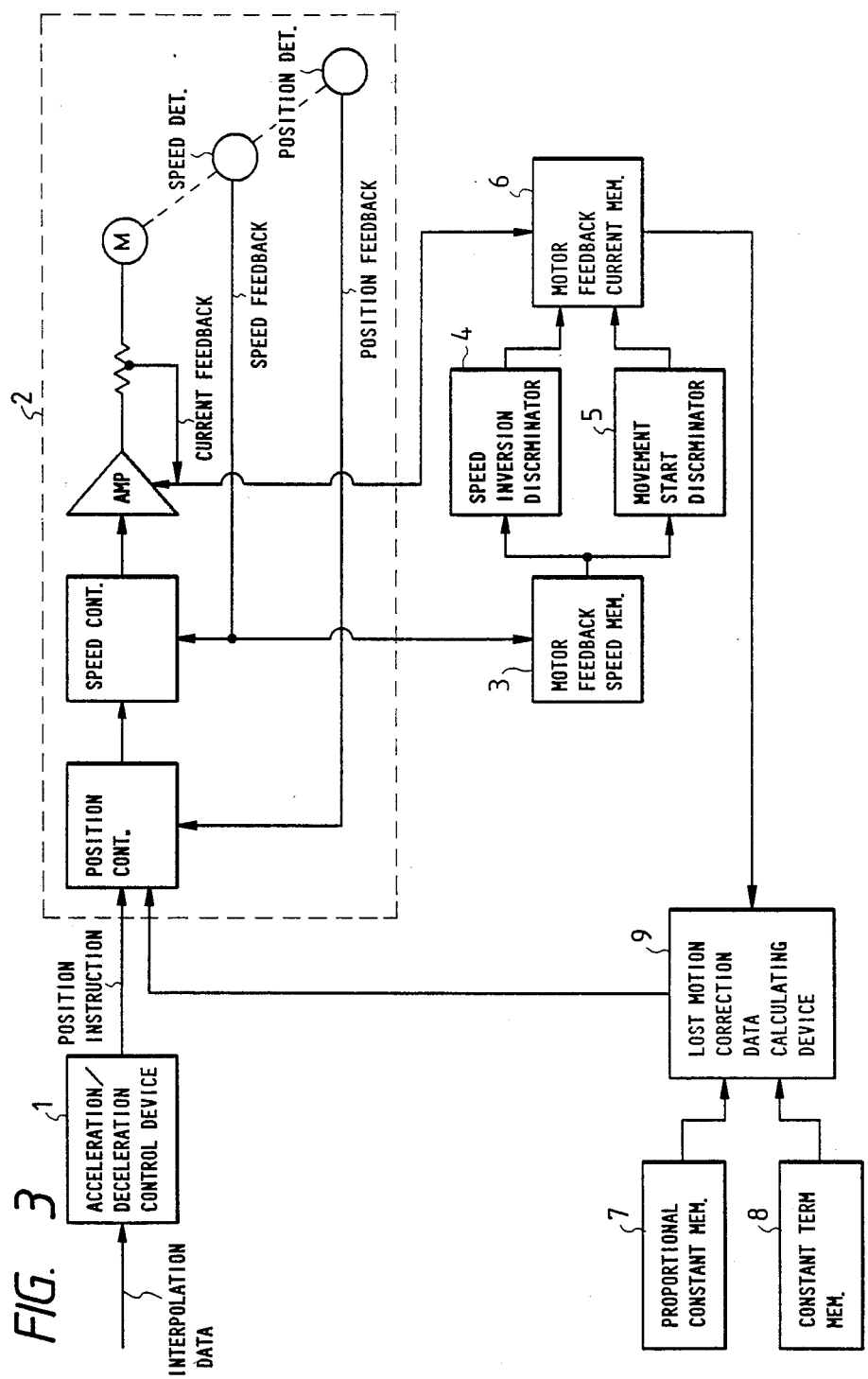

In FIG. 3, reference numeral 1 designates an acceleration and deceleration control device which receives interpolation data such as movement increment data, and performs the acceleration and deceleration control of a primary delay circuit for instance, and outputs a speed instruction for the motor; 2, a servo mechanism for performing the positioning control of the motor according to the output of the acceleration and deceleration control device 1; 3, a motor feedback speed memory device for storing a motor feedback speed (data) outputted by the servo mechanism 2; 4, a speed inversion discriminator for receiving the motor feedback speed stored in the motor feedback speed memory device, to determine whether or not the motor feedback speed is inverted in polarity, and 5, a movement start discriminator for receiving the motor feedback speed from the motor feedback speed memory device 3, to determine whether or not the motor movement is started.

Further in FIG. 3, reference numeral 6 designates a motor feedback current memory device for storing a motor feedback current (data) outputted by the servo mechanism 2; 7, proportional constant memory device for storing the proportional constant of a motor feedback current value and an amount of lost motion; and 8, a constant term memory device for storing the constant term in the proportion relation of a motor feedback current value and an amount of lost motion. The proportional constant memory device 7 and the constant term memory device 8 are RAMs (random access memories) in which the numerical values of the proportional constant and of the constant term are loaded for instance through a keyboard. Further in FIG. 3, reference numeral 9 designates a lost motion correction data calculating device having a table/function means, the device 9 receiving the data stored in the proportional constant memory device, the constant term memory device, and the motor feedback current memory device 6, to calculate an amount of lost motion correction.

Now, the operation of the numerical control device thus organized will be described.

Figure 4:
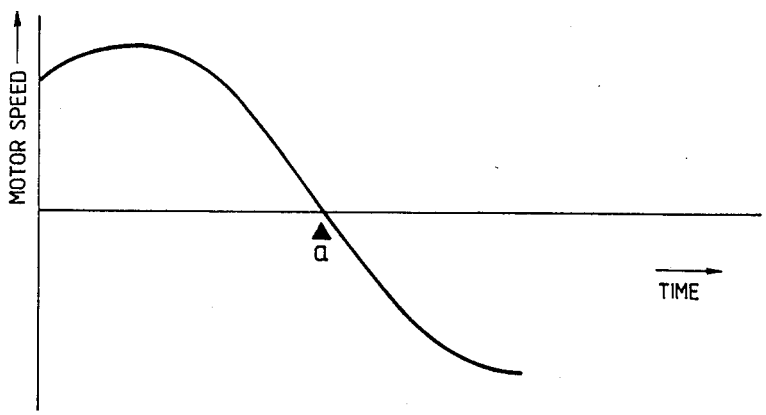
Figure 5:
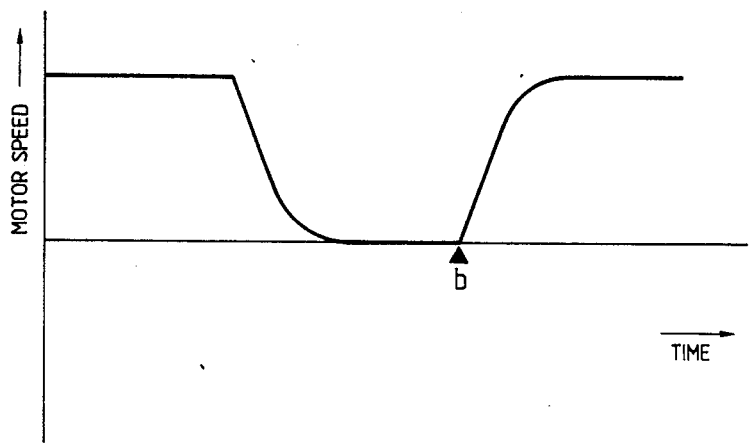

The output of the acceleration and deceleration control device 1, for instance position data such as a speed instruction for the motor, is applied to the servo mechanism 2. The servo mechanism 2 controls the motor according to the data applied thereto. In this operation, the motor feedback speed is sampled and applied to the motor feedback speed memory device 3. The speed inversion discriminator 4 obtains for instance the product of a motor feedback speed sampled and that sampled before it by receiving them from the motor feedback speed memory device 3, and determines whether or not the product is, for instance, negative, thereby to obtain the time instant (a in FIG. 4) where the motor feedback speed is inverted in polarity, and applies a motor feedback current value sampling instruction to the motor feedback current memory device 6. The movement start discriminator 5 receives motor feedback speeds from the motor feedback speed memory device 3 to determine, for instance, whether or not a motor feedback speed sampled is zero and that sampled before it is not zero, thereby to obtain the time instant (b in FIG. 5) where the motor starts movement, and applies a motor feedback current value sampling instruction to the motor feedback current memory device 6. In response to the instruction from the speed inversion discriminator 4 or the movement start discriminator 5, the motor feedback current memory 6 samples the motor feedback current outputted by the servo mechanism 2, and applies it to the lost motion correction data calculating device 9. The calculating device 9 applies the motor feedback current value applied thereto by the motor feedback current memory device 6 and the data stored in the proportional constant memory device 7 and the constant term memory device 8 to the table/function means built in it, to obtain an amount of lost motion correction $\epsilon$. The amount of lost motion correction $\epsilon$ is as follows:

$$\epsilon = a I + b \tag{4}$$

where I is the motor current stored in the motor feedback current memory device 6, a is the proportional constant stored in the proportional constant memory device 7, and b is the constant term stored in the constant term memory device 8.

The amount of lost motion correction obtained by the lost motion correction data calculating device 9 together with the output of the acceleration and deceleration control device 1 is applied to the servo mechanism 2.

Figure 6:
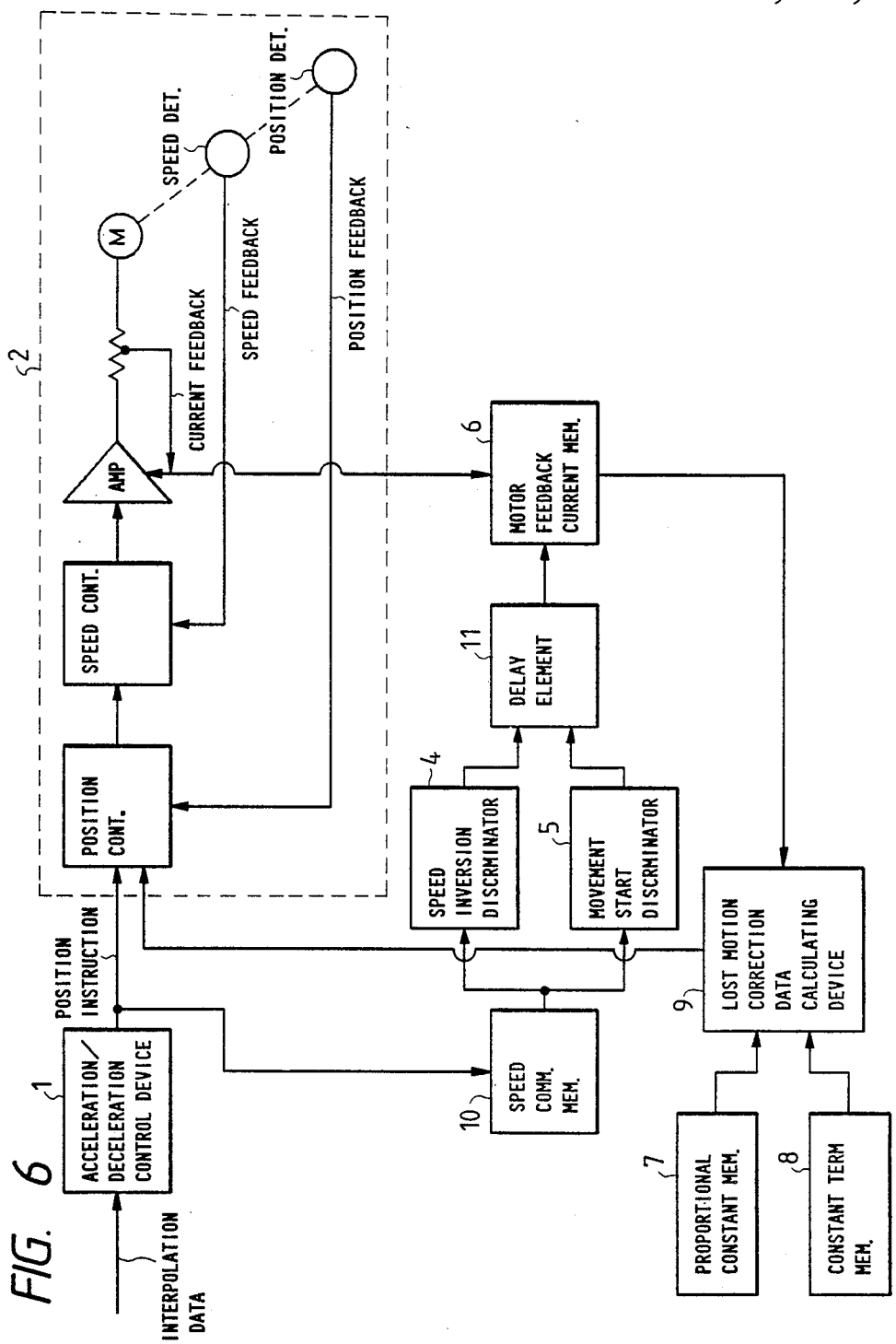
FIG. 6 is a block diagram showing the arrangement of a numerical control device for the correction of lost motion, which is a second embodiment of the invention.

FIG. 6 shows another embodiment of the invention. In FIG. 6, reference numeral 10 designates a speed instruction memory device; and 11, a delay element. In the embodiment, with respect to position data such as speed instruction applied to the servo mechanism 2 by the acceleration and deceleration control device 1, adjustment is made with the delay element with the aid of the servo mechanism.

Figure 7:
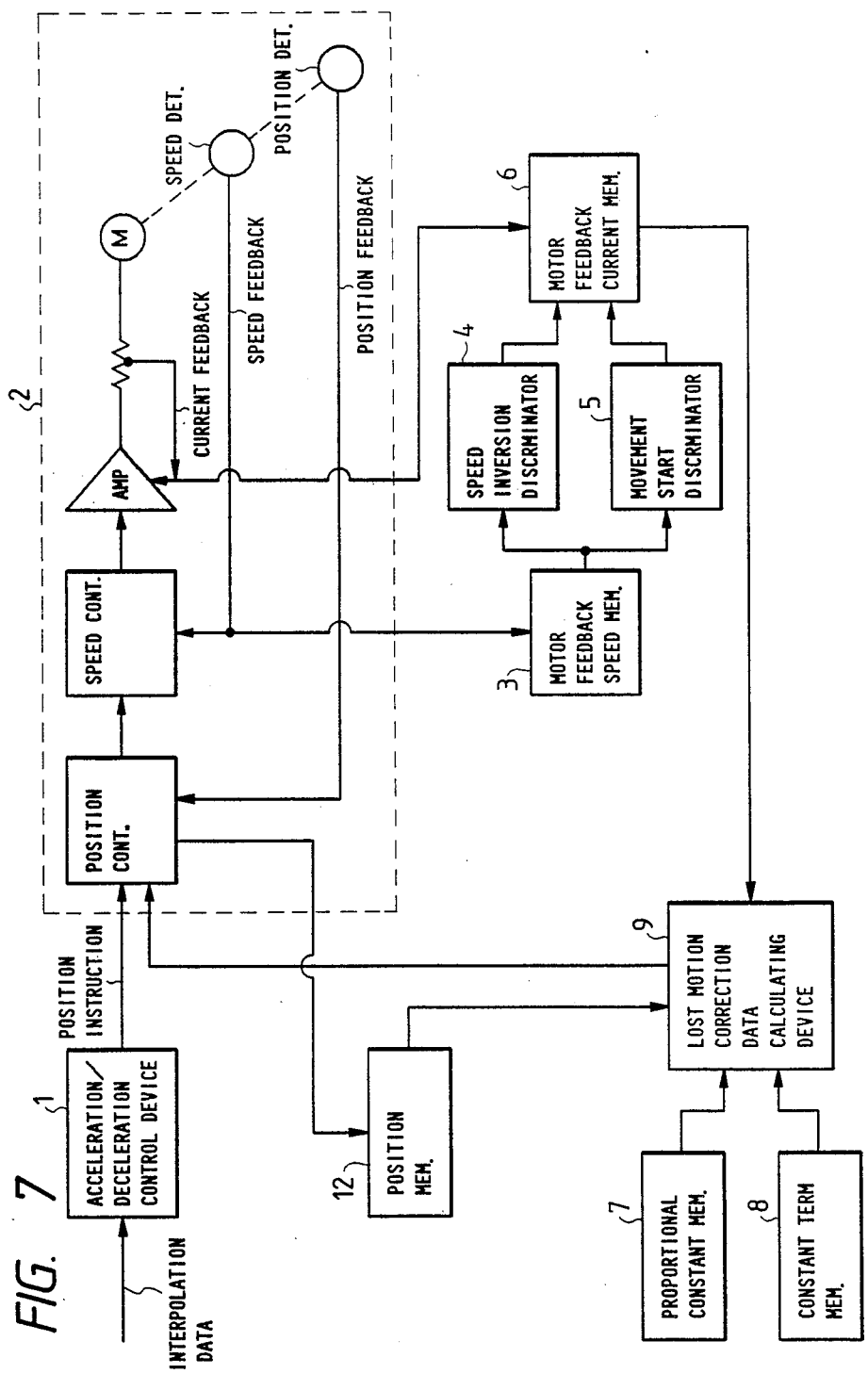
FIG. 7 is a block diagram showing the arrangement of one application of the numerical control device shown in FIG. 3.

FIG. 7 shows one application of the embodiment illustrated in FIG. 3. In FIG. 7, reference numeral 12 designates a position memory device 12, which stores the distance between the ball thread drive section and the nut section. The lost motion correction data calculating device 9 receives the motor current stored in the motor feedback current memory device 6, the proportional constant stored in the proportional constant memory device 7, the constant term stored in the constant term memory device 8, and the length between the drive section and the nut section stored in the position memory device, to calculate an amount of lost motion correction $\epsilon_1$ according to the following equation (5):

$$\epsilon_1 = a \cdot I + b + c \cdot L \cdot I \tag{5}$$

where I is the motor current, a and c are the proportional constants, b is the constant term, and L is the length between the drive section and the nut section.

Figure 8:
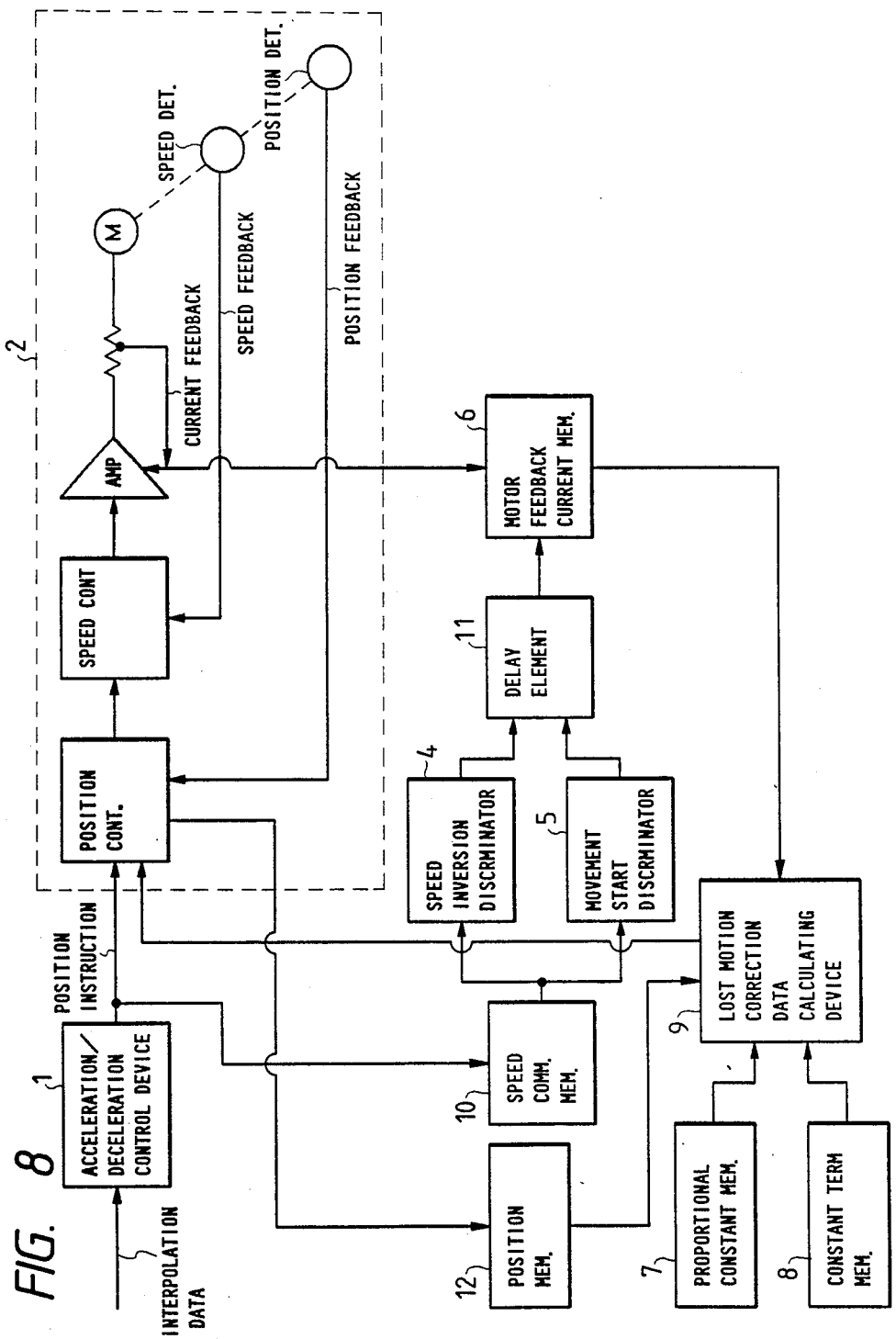
FIG. 8 is a block diagram showing the arrangement of one application of the numerical control device shown in FIG. 3.
Figure 9:
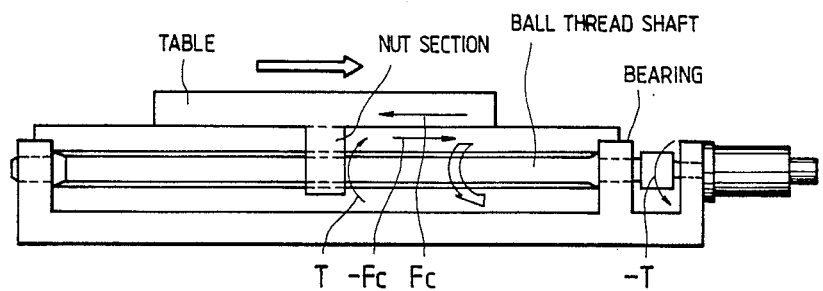
FIG. 9 is an explanatory diagram showing a general ball thread feed drive mechanism.
Figure 10:
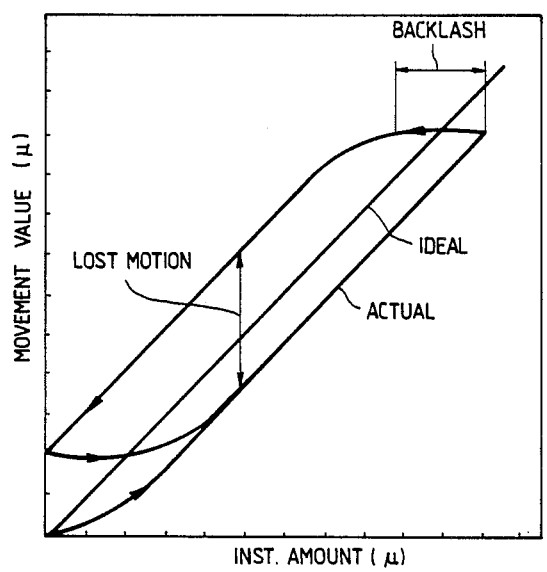
FIG. 10 is a graphical representation indicating the followup characteristics of a machine.
Figure 11:
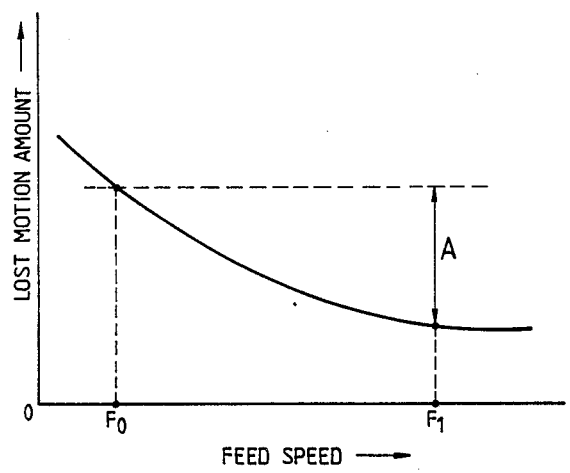
FIGS. 11 and 12 are graphical representations indicating general relations between amounts of lost motion and feed speeds.
Figure 12:
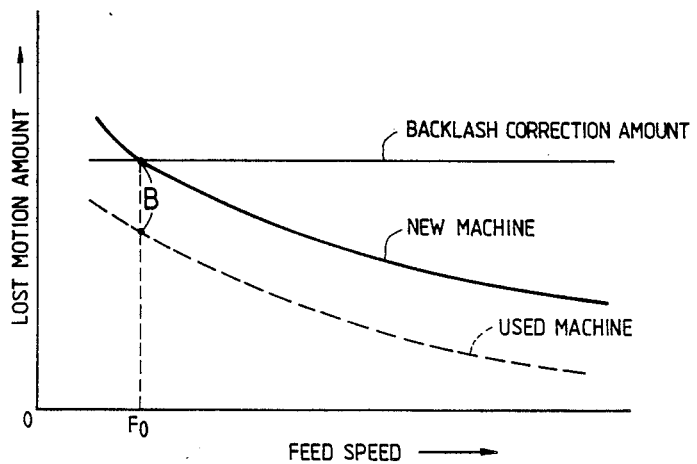

FIG. 8 shows one application of the second embodiment illustrated in FIG. 6. In FIG. 8, reference numeral 12 designates a position memory device, which stores the length between the ball thread drive section and the nut section. The operation of the circuit shown in FIG. 8 is substantially similar to that of the circuit shown in FIG. 6. The amount of lost motion correction is obtained according to equation (5).

In the above-described embodiments, the relation of proportion is established between the amount of lost motion correction and the drive current; however it goes without saying that, when a different relation is held therebetween, the correction can be made by use of the functional equation corresponding thereto.

In the above-described embodiments, the relation between the drive current and the amount of lost motion correction is obtained through the table/function. However, the relation between the drive current and the amount of lost motion correction stored may be stored in table means (memory device) so as to be used as data, or the table means may be combined with the function, for the same effect.

Furthermore, in the above-described embodiments, the RAMs are employed as the proportional constant memory device 7 and the constant term memory device 8; however, it goes without saying that ROMs (read-only memories) may be used therefor. In addition, logic circuits may be employed for the above-described data storing or calculating operations.

The embodiments of the invention have been described with reference to the cases in which the table is about to invert the direction of movement, and it starts movement; however, if, in other cases, for instance, immediately when the table is stopped, the fixed relations between the drive current, the table position, and the amount of lost motion correction can be obtained, then they may be employed.

As was described, the numerical control device of the invention has the table/function representing the drive current of the servo motor at a given time instant and the corresponding amount of lost motion correction, and the means for utilizing the drive current at the given time instant which is detected by the drive current detecting means to correct the lost motion according to the table/function is operation for the correction of lost motion. Therefore, with the numerical control device of the invention, the position error caused by the lost motion can be corrected with high accuracy. If necessary, the length between the drive section and the nut section can be utilized for the correction of lost motion, and accordingly, the machining operation can be achieved with higher accuracy.

What is claimed is:

1. A numerical control device for a machine tool having a mechanical movable part which is servo controlled by a servo motor in a servo mechanism, said device comprising:
   motor current detecting means for detecting at a given time the drive current of said servo motor; and
   lost motion correction data calculating means having a table/function which represents the drive current of said servo motor and the corresponding amount of lost motion correction,
   said lost motion correction data calculating means calculating an amount of lost motion correction according to said table/function by using said motor current detected at a given time instant by said motor current detecting means, and utilizing the result of said calculation to correct the lost motion of said mechanical movable part.

2. A numerical control device comprising:
   motor current detecting means for detecting at a given time the drive current of said servo motor in a servo system for servo-controlling a mechanical system; and
   means having a table/function representing a drive current of said servo motor and the amount of lost motion correction corresponding thereto, for calculating an amount of lost motion correction according to said table/function by using a drive current detected at a given time instant by said motor current detecting means, to correct the lost motion of said mechanical movable part.

3. A numerical control device comprising:
   motor current detecting means for detecting at a given time the drive current of said servo motor in a servo system for servo controlling a mechanical system;
   means for storing the distance between a ball thread drive section and a nut section; and
   means having a table/function representing the drive current of said servo motor and the amount of lost motion correction corresponding thereto, for calculating an amount of lost motion correction based on said table/function by using a drive current detected at a given time instant by said motor current detection means and the distance stored in said storing means, to correct the lost motion of said mechanical system.

* * * * *